UNITED STATES PATENT OFFICE.

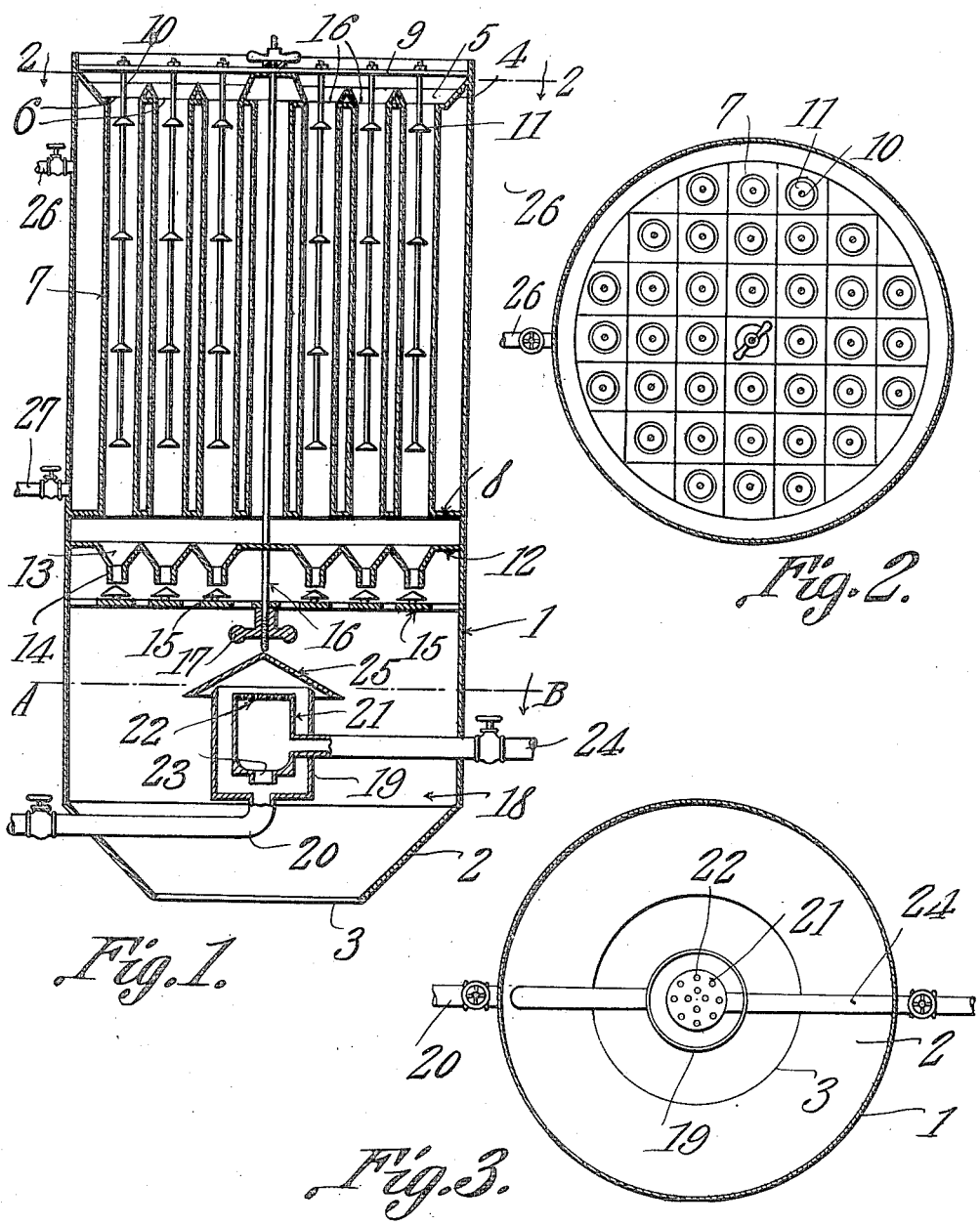

PETER PROVOST, OF MILWAUKEE, WISCONSIN.

APPARATUS FOR DRYING AND STEAMING GRAIN.

971,559. Specification of Letters Patent. Patented Oct. 4, 1910.

Application filed February 26, 1910. Serial No. 546,073.

*To all whom it may concern:*

Be it known that I, PETER PROVOST, a citizen of the United States, residing at Milwaukee, in the county of Milwaukee and State of Wisconsin, have invented a new and useful Apparatus for Drying and Steaming Grain, of which the following is a specification.

This invention relates to apparatus for drying and steaming grain and is more particularly an improvement upon the structure disclosed in Patent No. 940,190, issued to me on November 16, 1909.

One of the objects of the present invention is to provide means whereby the grain can be slightly retarded during its passage through the tubes and discharged in relatively small jets into a steaming chamber, means being utilized whereby each of the jets can be spread so as to insure the proper steaming of all of the grain.

Another object is to provide improved means for directing steam into the steaming chamber and for spreading it evenly therein.

A further object is to provide a machine of this class having means whereby the tubes can be thoroughly heated during the passage of the grain therethrough and thus dried prior to the discharge thereof into the steaming chamber.

With these and other objects in view the invention consists in certain novel details of construction and combinations of parts hereinafter more fully described and pointed out in the claims.

In the accompanying drawings the preferred form of the invention has been shown.

In said drawings:—Figure 1 is a central vertical section through a combined grain drier and steamer constructed in accordance with the present invention. Fig. 2 is a plan view thereof. Fig. 3 is a section on line A—B, Fig. 1.

Referring to the figures by characters of reference, 1 designates a casing, preferably cylindrical, the bottom of said casing being hopper shaped as shown at 2 and provided with a large outlet opening 3. The feed end of the casing is closed by a head 4 having a plurality of conical depressions therein, indicated at 5, there being an opening in the bottom of each depression as indicated at 6 and said opening being designed to direct material into a tube 7 secured at one end to the head 4 and extending around the opening. A number of these tubes are utilized, they being extended longitudinally within the casing and being mounted at their lower ends within a partition plate 8 extending transversely within the casing. A frame 9 may be supported in the upper end of the casing and rods 10, such as disclosed in my patent heretofore referred to, may be suspended from this frame and within the tubes 7, each rod carrying a series of deflecting devices 11.

Arranged within the casing and below the partition plate 8 is a disk 12 which is suitably supported in a fixed position relative to the tubes thereabove, said disk being provided with a series of hopper like or frusto conical depressions 13 each of which opens into a short hanging tube 14. These depressions and tubes are located directly under the tubes 7 and a frame 15 is movably mounted below the short tubes 14 and carries a plurality of conical valves 15, each valve being located directly below one of the tubes 14. A rod 16 may be extended longitudinally through the casing and also through the center of the frame 15, any suitable means, such as a nut 17 being mounted upon the lower end of the rod for the purpose of shifting the frame vertically to bring the valves 15 closer to or farther from the tubes 14 and thus control the escape of grain therethrough.

The space between the disk 12 and the bottom of the casing 1 constitutes a steaming chamber as indicated at 18. Arranged within the center of this chamber is a cup-like casing 19 having a drain pipe 20 extending from the bottom thereof and beyond one side of the casing 1. Mounted within the casing 19 is a nozzle 21, the upper end of which is provided with a plurality of apertures 22, there being a drain opening 23 in the bottom of the nozzle and above the pipe 20. A supply pipe 24 opens into the nozzle 21 and a conical deflector 25 extends over the casing 19 and the nozzle. Steam inlet pipes 26 open into the casing 1 near the upper end thereof and an outlet pipe 27 extends from  casing at a point above the partition 8. It is of course to be understood that these various pipes are provided with valves whereby the passage of steam through them can be controlled.

When it is desired to use this apparatus for drying grain, steam is admitted into the interior of the casing 1 through either or both of the pipes 26 and the tubes will therefore be thoroughly heated. The grain is then admitted to the upper or inlet end of the casing and will flow downward through the tubes 7 and be thoroughly heated thereby, the deflectors 11 serving to deflect the grain against the walls of the tubes. The grain will then be discharged from the lower end of the tubes and into the depressions 13 from which it will pass through the reduced tubes 14 to the interior of the chamber 18 from which it will pass outward through the opening 3. Should it be desired to utilize the apparatus for steaming grain, the steam is shut off from the pipes 26 and admitted through pipe 24 to the nozzle 21. It will thus escape through the upper apertured end of said nozzle and into the hood 25 which will spread the steam outwardly within the chamber 18. The grain in passing downward through the tubes will be discharged in small jets through the reduced tube 14 and be spread by the valves 15 so as to fall broadcast through the chamber 18 and the steam contained therein. Obviously all of the grains will thus be acted upon by the steam.

It is of course to be understood that various changes may be made in the construction and arrangement of the parts without departing from the spirit or sacrificing any of the advantages of the invention.

What is claimed is:—

1. Apparatus of the class described including a casing, a partition therein having hopper like depressions, there being tubes depending from and opening into said depressions, parallel tubes within the casing and above, and in vertical alinement with the depressions in the partitions, said tubes being spaced from the partition, a spreading device below each of the tubes depending from the depressions, and means for simultaneously shifting said spreading devices toward or away from the partition.

2. Apparatus of the class described including a casing, a partition, there being a plurality of depressions in the partition, and a tubular extension below and communicating with each depression, tubes spaced from and adapted to direct grain into the depressions, a valve below each of the tubular extensions, and means for simultaneously adjusting said valves toward or away from the extensions, each of the extensions being of less diameter than the tube thereabove.

3. Apparatus of the class described including a casing, having an upper heating compartment and a lower steaming compartment, tubes extending through the heating compartment, and open at their ends, a partition within the steaming compartment and having depressions, one of said depressions being arranged below each of the tubes and each depression having a tubular portion communicating therewith and depending therefrom, the diameter of each extension being less than the diameter of the tube thereabove, and means for simultaneously controlling the passage of material through all of the extensions and into the steaming compartment.

4. Apparatus of the class described including a casing, a partition therein, a head constituting a closure for one end of the casing, tubes connecting the head and partition, said head having hopper like inlets opening into the respective tubes, hopper like means entirely below the tubes for receiving jets of grain therefrom and directing it in reduced jets into the lower portion of the casing, and a steaming device located within said lower portion of the casing.

5. Apparatus of the class described including a casing, a partition within said casing and subdividing the same into heating and a steaming chamber, feed tubes extending longitudinally through the heating chamber, discharge tubes alining therewith, but of less diameter and extending into the steaming chamber, combined spreading and cut-off devices located below the discharge tubes, and a steam nozzle supported within the steaming chamber.

6. Apparatus of the class described including a casing, said casing being closed at its feed end, a partition within the casing and subdividing the same into heating and steaming chambers, said steaming chamber having an open bottom, tubes for directing grain longitudinally through the heating chamber, smaller tubes alining therewith and disposed therebelow, said smaller tubes being extended into the steaming chamber, a steam nozzle supported within the steaming chamber, and a hood above the nozzle for spreading the steam discharged therefrom.

7. Apparatus of the class described including a casing having a steaming chamber therein and provided with an outlet in the bottom thereof, discharge tubes extending into the top of said steaming chamber, heating tubes for directing grain into the discharging tubes, means for directing a heating medium around and in contact with the heating tubes, means within the steaming chamber for controlling the discharge of grain through the tubes therein and for spreading the grain discharged from said tubes, a casing within the steaming chamber and having a drain, a nozzle supported within said casing and a spreading hood extending over the nozzle and casing.

In testimony that I claim the foregoing as my own, I have hereto affixed my signature in the presence of two witnesses.

PETER PROVOST.

Witnesses:
EDGAR L. FOWLE,
M. C. BRICKWOOD.